Patented Mar. 26, 1940

2,194,476

UNITED STATES PATENT OFFICE 2,194,476

NITRILES OF FULLY ACETYLATED 2-KETO SUGAR ACIDS AND PROCESSES FOR THEIR PRODUCTION

Randolph T. Major, Plainfield, N. J., and Elmer W. Cook, New York, N. Y., assignors to Merck & Co., Inc., Rahway, N. J., a corporation of New Jersey No Drawing. Original application December 23, 1936, Serial No. 117,336. Divided and this application March 8, 1939, Serial No. 260,656

5 Claims. (Cl. 260—464)

This is a division of application Serial No. 117,336, filed December 23, 1936.

This invention relates to nitriles of fully acetylated 2-keto sugar acids.

We have discovered a new method of preparing the acid nitriles of these keto acids which involves the use of fully acetylated sugar acids as starting materials.

According to our improved process the selected fully acetylated sugar acid is first converted to its acid chloride, which latter is converted to the corresponding nitrile.

In the following examples, we are illustrating the steps of our process as applied specifically to pentaacetyl-d-gluconic acid and tetraacetyl-d, 1-xylonic acid:

FULLY ACETYLATED SUGAR ACID CHLORIDES

The dry fully acetylated sugar acid is added with cooling to a suspension of one molecular equivalent of phosphorous pentachloride in ten times its weight of dry ether. The reaction is soon completed, as shown by the disappearance of the phosphorous pentachloride.

Pentaacetyl-d-gluconyl chloride

After the solution has stood at room temperature for 2 or 3 hours, the ether is evaporated in vacuo. Dry xylene is then added. This and the phosphorous oxychloride formed in the reaction are removed by evaporation at 45 to 50°, in vacuo. The addition of xylene, followed by evaporation in vacuo, is repeated twice. The residual gum is dissolved in dry ether. Upon evaporation in a slight vacuum, beautiful white crystals separate. They have a melting point of 68–70°, and $$(\alpha)_D^{20} + 2°$$

(dry chloroform, c,2).

With water, the acid chloride gives pentaacetyl-d-gluconic acid monohydrate.

Tetraacetyl-d,1-xylonyl chloride

White crystals appear soon after solution of the phosphorous pentachloride. The precipitate is recrystallized from dry ether. The product has a melting point of 90–92°, and $$(\alpha)_D^{20} 0°$$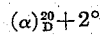

(dry chloroform; c,2).

FULLY ACETYLATED 2-KETO SUGAR ACID NITRILES

Pentaacetyl-2-keto-d-glucoheptonitrile

About 10 gms. of pentaacetyl gluconyl chloride are heated for one hour with 4.7 gms. of silver cyanide in a closed tube at 120–125° C. The fused contents are frequently shaken to insure good contact of the acid chloride with the silver cyanide. After cooling, the gummy material is thoroughly extracted with anhydrous ether and filtered from the silver salts. Petroleum ether is added carefully to precipitate a part of the product as a dark colored syrup, thereby removing most of the color. Then an excess of petroleum ether is added with cooling. A gum is precipitated along with some crystalline product. The supernatant liquor is poured off and on evaporation yields crystalline pentaacetyl-2-keto-d-glucoheptonitrile. The gum is dissolved in a small quantity of absolute alcohol and upon standing in an ice box for 24 hours yields a quantity of pentaacetyl - 2 - keto-glucoheptonitrile. The product is purified by recrystallizing it from absolute alcohol. It has a melting point of 116°, and $$(\alpha)_D^{20} = +7°$$

(dry chloroform, c,2).

When this compound is heated in water with either dilute acid or a base, hydrogen cyanide is evolved.

Tetraacetyl-2-keto-d,1-gulononitrile

This nitrile is prepared in the same way as pentaacetyl - 2 - keto-d-glucoheptonitrile, except that the filtrate obtained after the addition of sufficient petroleum ether to the ether extract to produce slight turbidity, is treated wih another larger portion of petroleum ether which precipitates a gum. Trituration of this gum with absolute alcohol yields a solid precipitate. It is recrystallized from alcohol, and has a melting point of 125–126°.

We claim as our invention:
1. Nitriles of fully acetylated 2-keto-sugar acids.
2. Pentaacetyl-2-keto-d-glucoheptonitrile.
3. Tetraacetyl-2-keto-d,1-gulononitrile.
4. Process for the production of tetraacetyl-2-keto-d,1-gulononitrile which comprises treating tetra-acetyl-d,1-xylonic acid chloride with silver cyanide.
5. Process for the production of pentaacetyl-2-keto-glucoheptonitrile which comprises reacting pentaacetyl gluconyl chloride with silver cyanide.

RANDOLPH T. MAJOR.
ELMER W. COOK.